Dec. 12, 1933.     J. H. WAGENHORST     1,939,328
AUTOMOBILE WHEEL

Original Filed July 6, 1925

INVENTOR.
J.H.Wagenhorst
BY Church & Church
his ATTORNEYS

Patented Dec. 12, 1933

1,939,328

UNITED STATES PATENT OFFICE 1,939,328

AUTOMOBILE WHEEL

James H. Wagenhorst, Jackson, Mich.

Original application July 6, 1925, Serial No. 41,835. Divided and this application April 2, 1927. Serial No. 180,479

2 Claims. (Cl. 301—6)

My invention relates to improvements in automobile wheels, and has to do, more particularly, with wheels adapted to carry pneumatic tires. My present invention is an improvement upon the invention disclosed in my pending application for Letters Patent for improvements in Vehicle wheels, Serial No. 726,529, filed July 17, 1924, and this application is a division of my pending application for patent for improvements in Automobile wheels Serial No. 41,835, filed July 6th, 1925.

As pointed out in said application, Serial No. 726,529, the widespread use of balloon tires has resulted in a decrease in diameter and an increase in width of the demountable rims, so that such rims are much stronger than they used to be for an automobile of corresponding size and weight. Furthermore, the adoption of four-wheel braking systems has necessitated the use of brakedrums on front as well as rear hubs. These factors have resulted in considerable increase in the unsprung weight. It is the main object of my present invention to provide an improved wheel construction resulting in a decrease of unsprung weight and in which the brakedrum is utilized as the body of the wheel, the demountable rim being detachably connected to such brakedrum by relatively short securing members or lugs, which add little to the weight of the structure, and stresses, such as load, sidethrust, and torque, being transmitted from hub to rim, or vice versa, through the brakedrum instead of through a set of spokes and a felly construction as in the usual automobile wheel.

It is a further object of my invention to provide a wheel construction of this character, in which the brakedrum is dished in order to strengthen it against the load strains imposed upon it. A further object of my invention is to provide a novel connection between the securing members and the brakedrum, the connection being of such a nature that it will maintain itself tight under working conditions.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawing, forming a part of this specification, in which Figure 1 is a fragmentary view, in front elevation, of a wheel embodying my invention;

Figure 1:
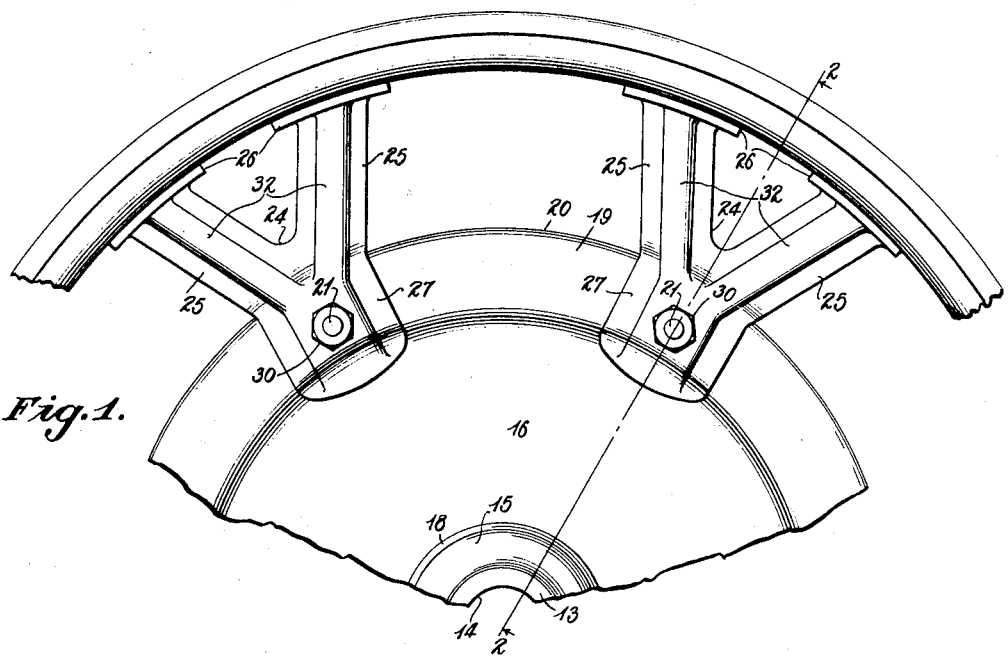
Figure 3:
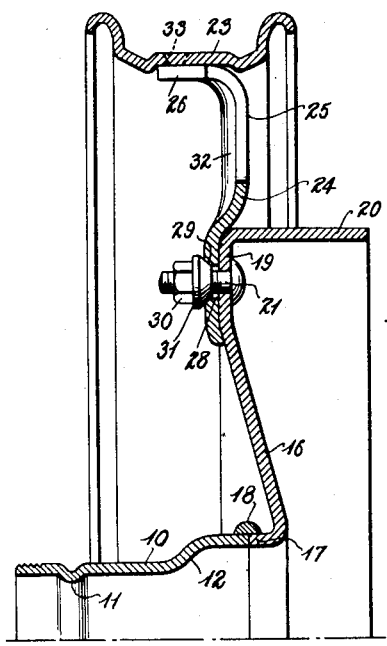
Fig. 3 is a similar view, showing a slightly different form of connection between the spoke member and the brakedrum.

Referring to the numbered parts of the drawing, I have shown a front wheel hub 10, formed of pressed metal and having a rib 11 and shoulder 12, formed therein, to serve as locating shoulders for the usual front wheel bearings. This front wheel hub is shown in Fig. 3. The rear wheel hub 13 (shown in Fig. 2) has a tapered bore 14 therein to receive the end of the axle shaft. Near the rear end of the hub 13 is formed a flange 15 extending parallel to, but spaced from the body of the hub. The free edge of the flange 15 is of the same diameter as the rear end of the front hub 10.

Figure 2:
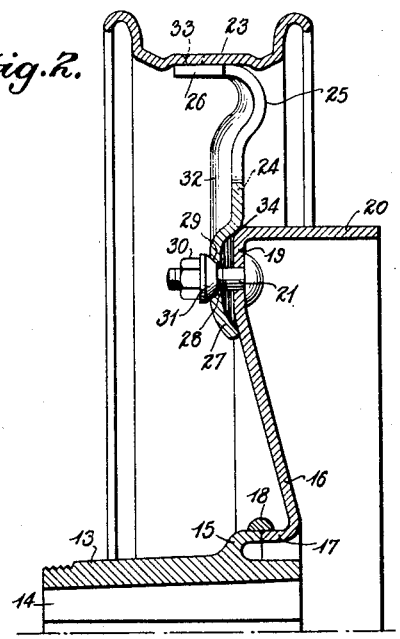
Fig. 2 is a radial sectional view taken on the line 2—2 of Fig. 1.

The brakedrum 19 comprises a cylindrical braking flange 20, a vertical portion extending inwardly from the front edge of said flange and a central body portion 16 dished rearwardly from the inner edge of the vertical portion and having a central cylindrical flange 17. As shown in Fig. 2, this flange is welded, at 18, to the rear edge of the flange 15 of the rear hub, while, in Fig. 3, this flange is welded, at 18, to the rear edge of the front hub. By dishing rearwardly the central portion 16 of the side wall of the brakedrum, the brakedrum is reinforced against the load strain imposed upon it, and a structure is provided which is entirely adequate to transmit the various stresses from hub to rim, or rim to hub, as the case may be.

The demountable tire-carrying rim 23 has a plurality of securing lugs or spoke members 24, rigidly attached thereto. As shown, these members are Y-shaped, having the diverging portions 25, which terminate in the flanges 26, engaging the inner face of the demountable rim and secured thereto by studs 33, extending from said flanges through openings in the base of the rim and riveted over. The radial part 27 of each securing lug or spoke member engages the periphery of the brakedrum, as at 34, and has a bolt hole 28 with a conical or countersunk recess 29 at its forward end. The studs or bolts 21, carried by the vertical portion of the brakedrum, extend through the bolt holes 28 and nuts 30 are screwed upon said bolts until the conical faces 31 of the nuts seat in the conical recesses 29. The securing lugs or spoke members 24 may be ribbed, as at 32, to strengthen them. The rib 32 also cooperates with the nut 30 and bolt 21, to keep the nut tight. Due to the rib 32, the nut 30 engages a portion of the securing member spaced from the brake drum. The securing member contacts with the brakedrum alongside of and above and below the nut 30, and, when the nut is screwed up, the pressure exerted by it causes the intermediate spaced portion of the securing member to yield slightly, thus setting up a reaction on the nut like that of a spring washer, and tending to keep the nut tight. The engagement of the securing member 24 with the brakedrum, at 34, transmits load strains directly to the brakedrum in line with the vertical portion thereof. This provides for an effective transmission of load strains.

In the construction shown in Fig. 3, the ribs 32 terminate at the points where the securing member engages the periphery of the brakedrum, and the inner portion of the securing member 27 is substantially flat and is clamped in engagement with the vertical portion of the brakedrum by screwing up the nut 30.

I am aware that the construction disclosed herein may be changed considerably, without departing from the spirit of my invention, and, therefore, I claim my invention broadly, as indicated by the appended claims.

I claim:

1. A wheel comprising a brakedrum, a tire-carrying rim, a plurality of pressed metal securing members rigidly connected to the rim, the inner portion of each member engaging the brakedrum at radially spaced points and being spaced from the drum between such points, bolts extending through the drum and the inner portions of said members at the parts of the latter which are spaced from the drum, and nuts screwed on the bolts and engaging said securing members.

2. A wheel comprising a brakedrum, a tire-carrying rim, a plurality of pressed metal securing members rigidly connected to the rim, the inner portion of each member engaging the brakedrum at radially spaced points and being spaced from the drum between such points, bolts extending through the drum and the inner portions of said members at the parts of the latter which are spaced from the drum, and nuts screwed on the bolts and having convex faces engaging concave recesses in said securing members.

JAMES H. WAGENHORST.